May 31, 1938.    G. H. LE BOEUF    2,119,051
AUTOMOBILE BAGGAGE CARRIER
Filed June 4, 1936
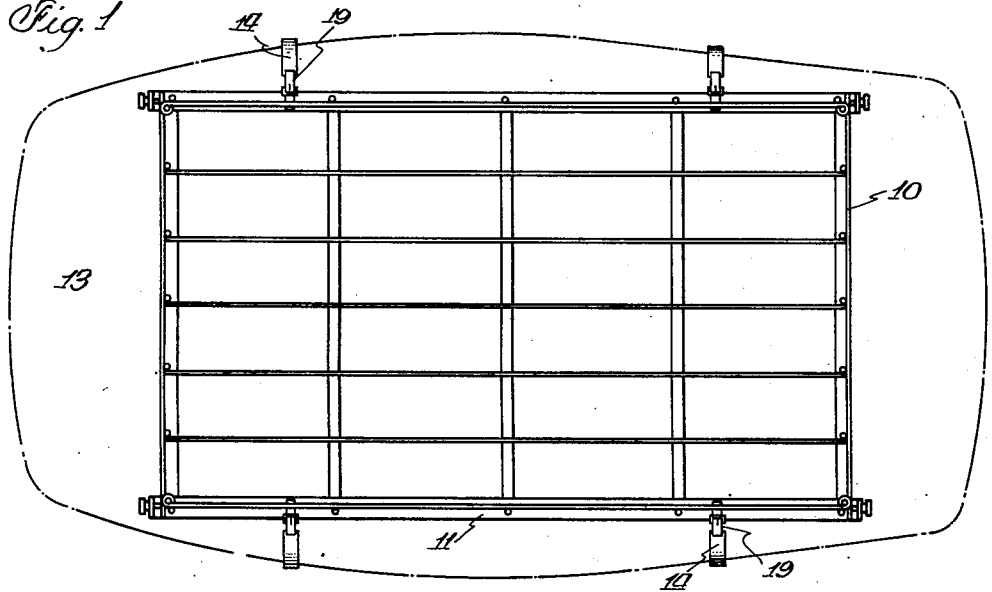
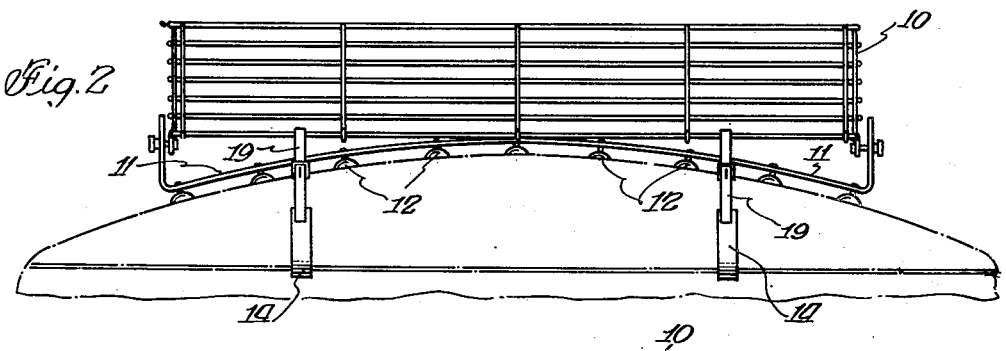
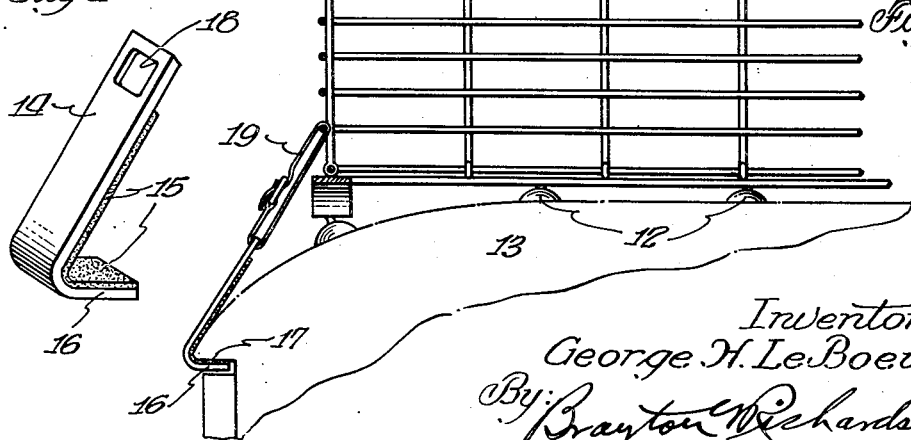
Inventor:
George H. Le Boeuf.
By Brayton Richards
Attorney.

Patented May 31, 1938

2,119,051

UNITED STATES PATENT OFFICE 2,119,051

AUTOMOBILE BAGGAGE CARRIER

George H. Le Boeuf, Manitowoc, Wis.

Application June 4, 1936, Serial No. 83,435

1 Claim. (Cl. 224—29)

The invention relates to improvements in automobile baggage carriers and has for its primary object the provision of an improved construction of the class indicated which is capable of economical production and highly efficient in use.

Another object of the invention is the provision of an improved construction of the character indicated constructed and arranged to be readily mounted upon and secured to the top or roof of an automobile body in such a manner as to avoid any ordinary interference with the normal uses thereof.

Other objects will appear hereinafter.

The invention consists in the combination and arrangement of parts hereinafter described and claimed.

The invention will be best understood by reference to the accompanying drawing forming a part of this specificaiton and in which Fig. 1 is a top plan view of an automobile baggage carrier embodying the invention and shown in position of use;

Fig. 2 a partial side view of the same;

Fig. 3 a partial end view of the same; and

Fig. 4 a detailed perspective view of one of four anchoring members employed in the construction.

The embodiment of the invention illustrated in the drawing comprises a baggage receptacle 10 of open frame-work construction consisting of spaced bars or slats adjustably mounted on supporting members 11, which in turn are supported on rubber vacuum cups or cushions 12 contacting with the top 13 of the automobile. As will be noted, the supporting members 11 are in the form of curved thin strips or bars extending longitudinally under the sides of the receptacle 10; secured thereto centrally and having adjustable connections at their ends to the ends thereof, and whereby said supporting members may be nicely adjusted to the curvature of the top of an automobile. The receptacle thus provided is held in place on the top of the automobile by means of four hook-like anchoring members 14 having protective linings 15 of leather or the like and each equipped with a hook-like extension 16 adapted and arranged to engage under the usual ledge 17 at the edges of the top of the automobile body as shown.

Each of the members 14 is provided at its upper end with a securing opening 18, and an adjustable strap 19 is looped through said opening and around an adjacent side bar of the receptacle 10 and whereby said receptacle may be secured in place on the top of the automobile.

By this arrangement a simple and efficient baggage carrier is provided which is of light weight, may be readily applied to or detached from an automobile body, and which will not interfere in any way with the normal uses of said body. The specific form and arrangement of parts disclosed is a simple and effective one for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claim.

I claim:

A construction of the class described comprising a baggage receptacle; two supporting members in the form of curved thin strips arranged under the sides thereof and secured centrally to the bottom thereof, the ends of said strips being adjustably secured to said receptacle; contact members on the under sides of said supporting members arranged to contact with the top of an automobile; and binding means connected with said receptacle and arranged to secure the same to an automobile top.

GEORGE H. LE BOEUF.